(12) United States Patent
Hermansson (10) Patent No.: US 7,246,538 B2
(45) Date of Patent: Jul. 24, 2007

(54) CENTERING DEVICE FOR LONGITUDINAL ELEMENTS AND A RESETTING DEVICE FOR MOTOR VEHICLES

(75) Inventor: Bengt Hermansson, Mullsjö (SE)

(73) Assignee: Kongsberg Automotive AB (SE)

( * ) Notice: Subject to any disclaimer, the term of this patent is extended or adjusted under 35 U.S.C. 154(b) by 566 days.

(21) Appl. No.: 10/470,668

(22) PCT Filed: Feb. 1, 2002

(86) PCT No.: PCT/SE02/00184

§ 371 (c)(1),
(2), (4) Date: Jan. 9, 2004

(87) PCT Pub. No.: WO02/061522

PCT Pub. Date: Aug. 8, 2002

(65) Prior Publication Data

US 2004/0112162 A1 Jun. 17, 2004

(30) Foreign Application Priority Data

Feb. 2, 2001 (SE) .................................. 0100311

(51) Int. Cl.
*B60K 20/00* (2006.01)
(52) U.S. Cl. ..................... 74/473.28; 74/527; 24/33 P
(58) Field of Classification Search .............. 74/473.1, 74/473.29, 473.3, 527; 24/265 WS, 33 P, 24/265 B See application file for complete search history.

(56) References Cited

U.S. PATENT DOCUMENTS

| 1,742,457 | A | * | 1/1930 | Wittman ................. 24/265 WS |
| 1,935,234 | A | * | 11/1933 | White ........................... 74/527 |
| 4,070,914 | A | * | 1/1978 | Reinhardt et al. ........ 74/473.11 |
| 4,338,828 | A | * | 7/1982 | Ruhlman ................. 74/473.27 |
| 4,676,118 | A | * | 6/1987 | Leiter ...................... 74/473.14 |
| 4,922,784 | A | * | 5/1990 | Hidaka et al. ................. 74/527 |
| 5,156,065 | A | * | 10/1992 | Fujimoto et al. ............. 74/527 |
| 5,309,784 | A | * | 5/1994 | Kobayashi et al. ...... 74/473.33 |

(Continued)

FOREIGN PATENT DOCUMENTS

EP 0 899 478 A1 3/1999

(Continued)

*Primary Examiner*—David M. Fenstermacher
(74) *Attorney, Agent, or Firm*—Lerner, David, Littenberg, Krumholz & Mentlik, LLP (57) ABSTRACT

A centering device for elongated elements consisting of a fixed position-retaining part (13) which includes a concave guiding surface (16), and a mobile position-retaining part (12) arranged on the elongated element, or vice versa. The mobile position-retaining part (12) includes a pin (14) which is spring biased for contact against the concave guiding surface. The pin (14) is arranged in at least one casing, and is together with the casing arranged in a cavity (20) in a holder which is fixedly attached to the elongated element with a pin head (23) protruding out of an opening (24) in a front end of both the casing and the holder. The holder (15) includes a seat (38) with a guiding surface for a peripherally conical portion (36) of the casing. This is spring biased in the axial direction so that the conical portion strives to be in contact with the seat of the holder in and for centering of the casing and the pin relative to the longitudinal axis (21) of the holder.

6 Claims, 9 Drawing Sheets

U.S. PATENT DOCUMENTS

| | | | |
|---|---|---|---|
| 5,309,787 A * | 5/1994 | Soyka et al. | 74/527 |
| 5,398,569 A * | 3/1995 | Carr | 74/560 |
| 5,476,021 A | 12/1995 | Burger | |
| 5,588,338 A * | 12/1996 | Carr et al. | 74/560 |
| 5,634,375 A * | 6/1997 | Schnapp et al. | 74/473.21 |
| 5,979,269 A * | 11/1999 | Su-Chen | 74/564 |
| 6,197,030 B1 * | 3/2001 | Pham | 606/72 |
| 6,382,045 B1 * | 5/2002 | Wheeler | 74/473.12 |
| 6,658,959 B2 * | 12/2003 | Wildeshaus et al. | 74/473.27 |
| 2001/0017063 A1 * | 8/2001 | Wildeshaus et al. | 74/473.29 |
| 2003/0154813 A1 * | 8/2003 | Molde et al. | 74/473.28 |

FOREIGN PATENT DOCUMENTS

| | | |
|---|---|---|
| WO | WO-99/32316 A1 | 7/1999 |
| WO | WO-00/03162 A1 | 1/2000 |

\* cited by examiner

CENTERING DEVICE FOR LONGITUDINAL ELEMENTS AND A RESETTING DEVICE FOR MOTOR VEHICLES

FIELD OF THE INVENTION

The present invention relates to a centering device for elongated elements, and an adjustment device for motor vehicles.

BACKGROUND OF THE INVENTION

There are a number of different types of centering devices which are comprised in adjustment devices for various purposes. Examples are manoeuvring devices such as gearshifts for manoeuvring of the gearbox of a vehicle. The gear-controls exhibit a console and a gear stick which is movable in the console and which is adjustable between various gear positions. Both the suspension of the gear stick and various locking parts are examples of sources of various loose play and vibrations due to unavoidable tolerances. With conventional solutions, requirements for tolerances must be weighed against costs. Between the adjustable part and the console in which it is suspended, there is in many cases a position-retaining device in the form of a locking part with a pin, which is movable in a bore, where intermediate play can cause a feeling of indistinct locking positions and vibrations.

SUMMARY OF THE INVENTION

The purpose of the present invention is to provide a centering device and an adjustment device in which the above-mentioned drawbacks with play and high costs for small tolerances are negated.

The said purpose is obtained by means of a centering device or an adjustment device described and claimed hereafter.

By means of the device according to the invention, the parts involved in the interaction between the elongated element and its associated holder can be produced with relatively large tolerances without any play arising.

BRIEF DESCRIPTION OF THE FIGURES

The invention will be described in more detail below by means of an example of an embodiment, with reference to the appended drawings in which FIG. 1 is a perspective view of a first embodiment of an adjustment device provided with a position-locking device according to the invention, while

PREFERRED EMBODIMENT

The example shown is an adjustment device of the manoeuvring device kind for motor vehicles, for example a gear shifting device for the manoeuvring of a gearbox of an engine in a motor vehicle. The gearbox can either be a manual gearbox or an automatic gearbox. In the example shown, the manoeuvring device is primarily intended for an automatic gearbox, and for the sake of clarity it has been given a relatively simple adjustment movement for adjustment between various gear-positions, in more detail a simple pivotal movement about one single pivot axis between two or several predetermined positions.

Figure 1:
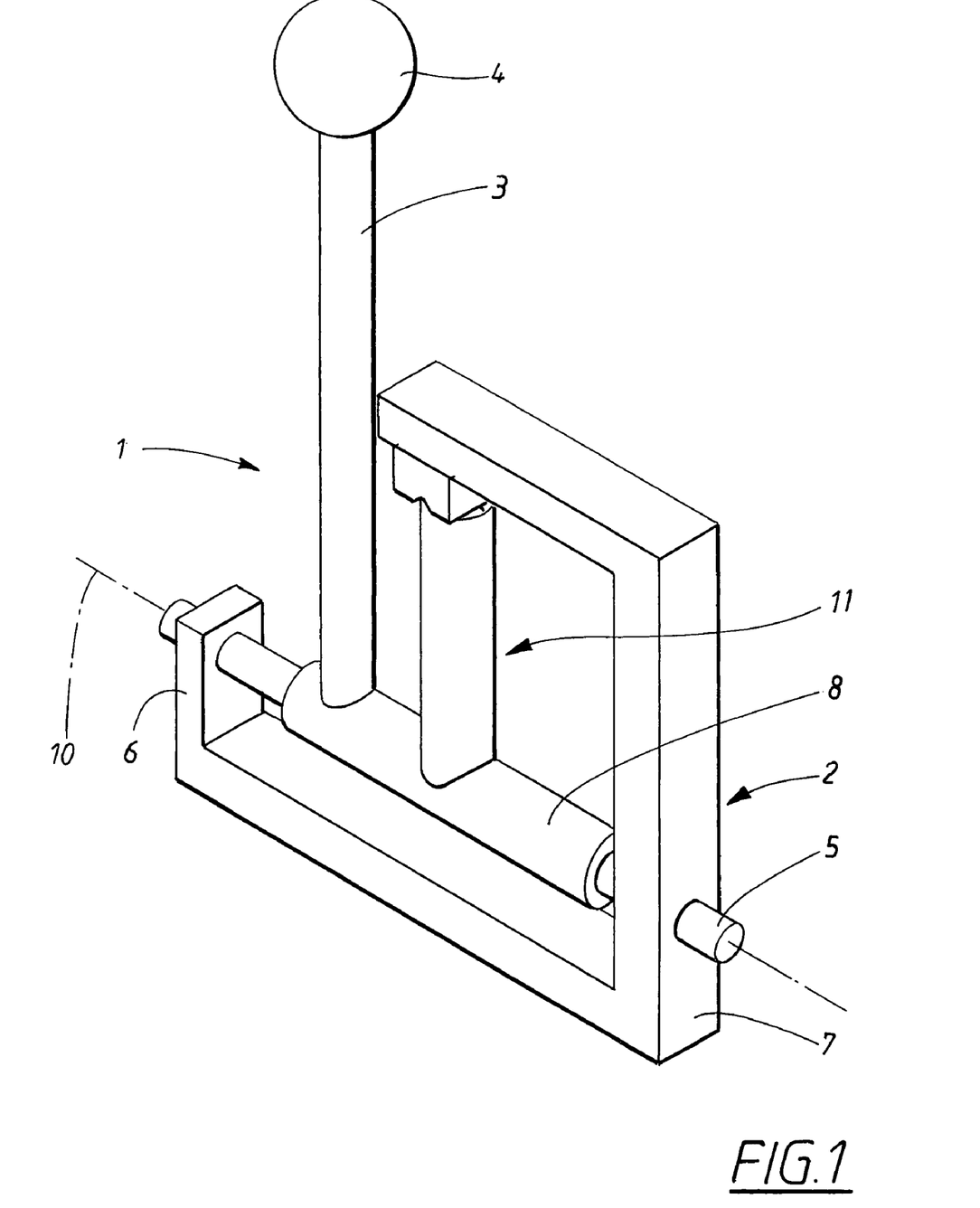
Figure 2:
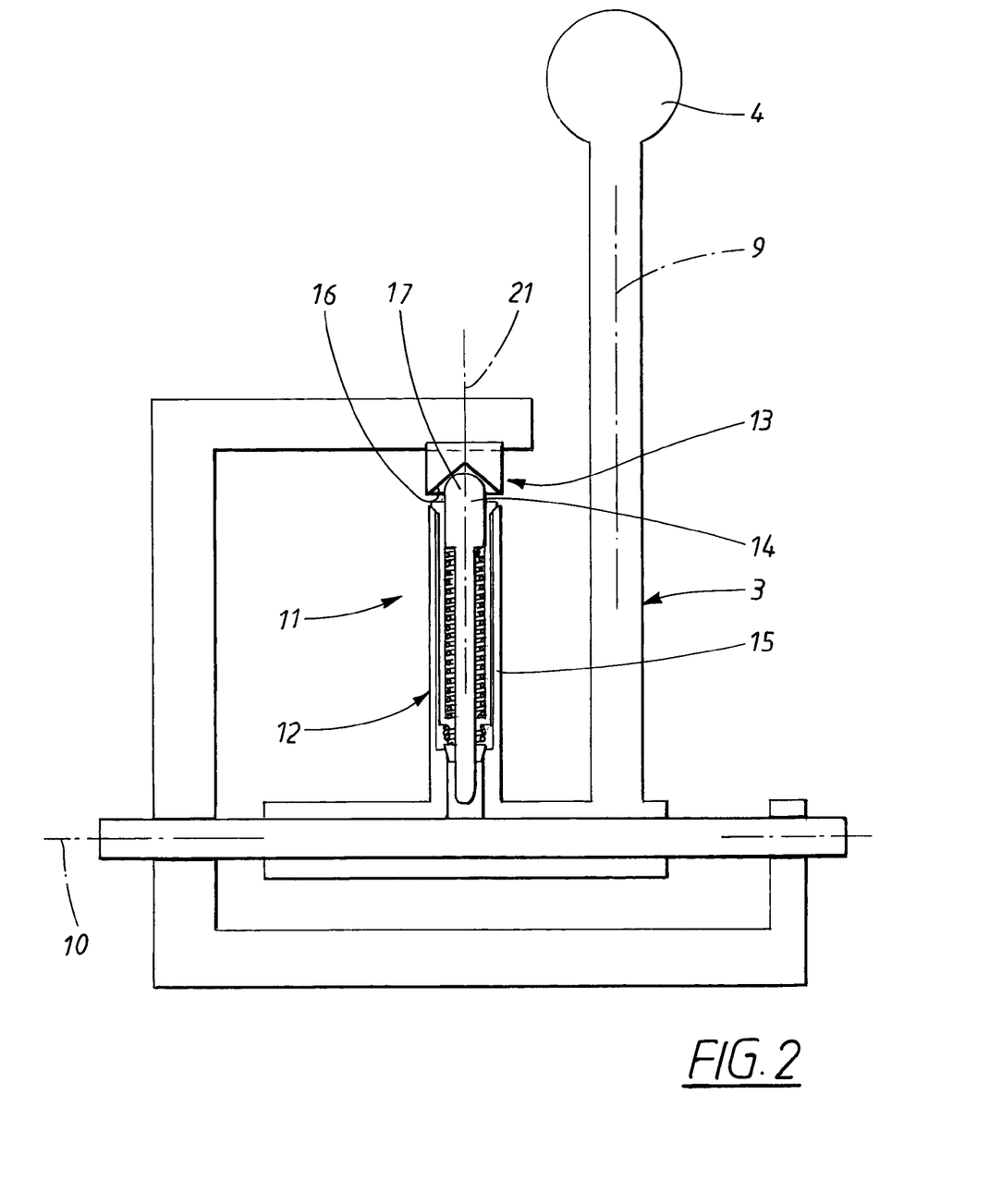
FIG. 2 is a longitudinal cross-section through the adjustment device of FIG. 1.
Figure 3:
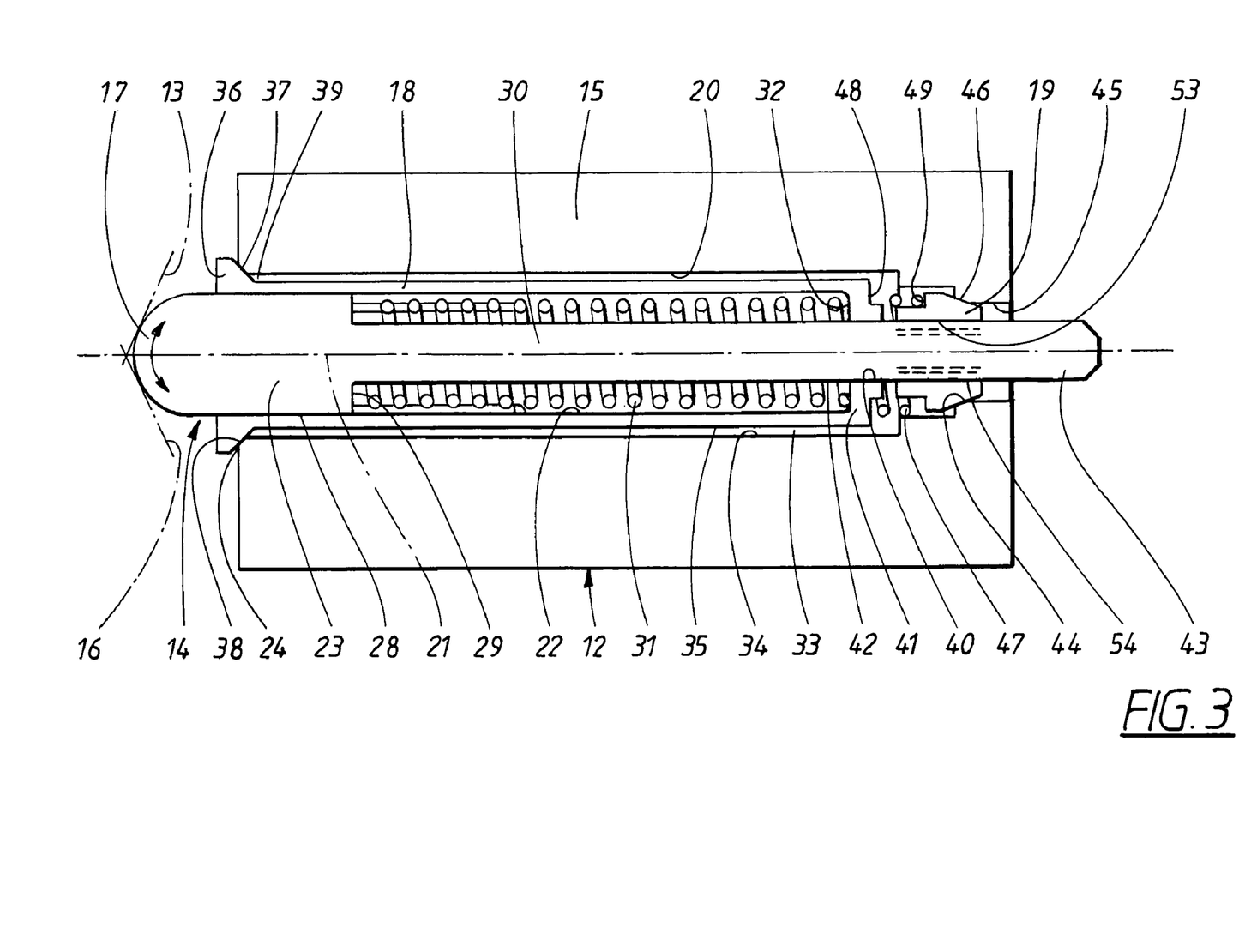
FIG. 3 is a longitudinal section through the position-locking device according to the invention.

The adjustment device, from now on referred to as the manoeuvring device, exhibits an adjustable part, from now on referred to as the manoeuvring part 1, which is movably arranged in a console 2 which is attached to a motor vehicle. The manoeuvring part 1 exhibits a manoeuvring stick 3 with a stick knob 4, which is intended to be gripped by the operator, i.e. the driver, if the manoeuvring device is a gear-shifting device. By means of manual movements using the stick knob, the manoeuvring part 1 is intended to be adjusted between various manoeuvring positions relative to the console 2. The manoeuvring part 1 is movably arranged in the console 2 by means of a manoeuvring axis 5, which in the example shown is attached to the console, in more detail into side-portions 6, 7, and extends for example through co-axially arranged holes in the console. The manoeuvring axis 5 can alternatively be fixedly arranged in the console, while the manoeuvring part 1 exhibits an axis casing 8 which is rotateably arranged around the axis 5. In both cases, the manoeuvring part defines a geometrical axis of rotation 10 about which the manoeuvring part 1 is rotateably arranged in bearings between its manoeuvring positions. In the example shown, the stick 3 is thus adjustable by means of a pivotal motion essentially along a plane which extends through the longitudinal axis 9 of the stick, perpendicular to the plane of the paper in FIG. 2.

In order to define the various fixed positions of the manoeuvring device, in the case of a gearshift device its gear-positions, and to retain the manoeuvring stick 3 in these positions there is provided a position retaining device 11 in the form of a moving position retaining part 12, which in the example shown accompanies the manoeuvring part 1 in its adjustment positions, and a fixed position retaining part 13 in the console 2, with which the movable part is intended to interact. The movable position retaining part 12 is essentially elongated, and exhibits a pin 14 or a plunger which is arranged in the manoeuvring part 1, in more detail in a holder 15 which is fixedly attached to the manoeuvring part 1. The pin 14 is spring biased so that it is biased with a spring force directed along a longitudinal axis in the holder 15. The longitudinal axis 21 is directed crossways relative to the pivot axis 10, in the example shown radially against the pivot axis.

The fixed position retaining part 13 is constituted by a part fixedly attached to the manoeuvring console 2, or a portion which exhibits a recessed, i.e. concave guiding surface 16 which faces a rounded end portion 17 of the pin 14. Due to the spring biasing, the pin strives to move to the bottom of the recessed guiding surface, which is so shaped that a distinct position is obtained. In the example shown, a V-shaped guiding surface has been chosen which can be pyramid shaped, so that a shape corresponding to FIG. 2 of the guiding surface is present even when seen in a section across the plane of the paper. The guiding surface 16 can alternatively have the same shape as the rounded end part 17, so that surface contact is obtained in the predetermined positions. In the case of a V-shaped guiding surface, there is obtained two, or in the pyramid form case four, points of contact which also provide distinct positions. The angles of the guiding surface 16 are so chosen relative to the spring force that a pivotal movement of the manoeuvring stick 2 about its axis of rotation 10 will cause a movement radially inward of the pin 14, so that the pin leaves its distinct position and follows in the rotating movement along a path which extends perpendicularly towards the plane of the paper according to FIG. 2, until a second distinct position has been found with a corresponding shape.

In order to see to it that there is play in the pin 14 relative to its holder 15, the adjustment device according to the invention is provided with a centering device with a design which will be described in more detail in the following with reference to FIGS. 2-5. According to the invention, the spring biased pin 14 is suspended so that it is not movable directly in the holder 15, but via two intermediate guiding casings, a front or outer casing 18, and a rear or inner casing 19. The pin 14 and the casings 18, 19 are separate moving parts which essentially are housed in a cavity 20 in the holder 15. The cavity 20 is rotationally symmetrical, i.e. it exhibits circular radial cross-sections relative to the movable position-retaining part's longitudinal axis 21. The front casing 18 in turn exhibits a cavity 22, which suitably is essentially cylindrical and forms an inner sliding surface for a head 23 of the pin, with the front casing at least in a portion flush with the head of the pin exhibiting grooves or slits 25, 26, 27 which extend from the front opening 24, see FIG. 4. In this way the casing at the opening becomes slightly elastic radially, and is dimensioned to tightly, i.e. without any play, connect to the head of the pin 14, in more detail a cylinder jacket shaped surface 28 of the head, see below for more detail. Alternatively, both the head and the casing can have a form other than circular, they can be triangular, rectangular or have plurality of corners, alternatively be not round, such as oval.

The pin 14 includes the head 23 and a guiding shaft 30 with a step 29 formed therebetween. A pressure coil 31 is mounted on the shaft 30. In more detail, the pressure coil which is shaped as a spring coil around the shaft 30 is tensed in between the step 29 of the pin 14 and an inner end surface 32 of the cavity 22.

The cavity 20 of the holder 15 is along the main part of the extension of the pin 14 cylinder-shaped, and has a diameter which slightly exceeds the outer diameter of the front casing 18, so that there is a casing shaped hollow 33 between the inwards facing casing wall 34 of the cavity and the outwards facing cylindrical casing wall 35 of the casing 18. In addition, the front casing 18 at its front or forward, i.e. in connection to its forward opening 24 changes into an extended portion 36, with a conical "backwards" from the opening 24 facing guiding surface 37. This is arranged to interact with, and obtain support from, a corresponding conical guiding surface 38 which extends around the forward opening 39 of the cavity 20 in the holder 15. Since the forward casing 18 will always be spring biased with an axial force directed backwards, i.e. towards the right along the axis 21 in FIG. 3, the conical guiding surfaces 37, 38 create radial symmetrical forces of the sectored portion 36 in the direction of the pin 14. In this way, the front casing 18 forms a centering jacket for the guiding pin, which centres and creates a position without play for the pin 14 at its head 23 relative to the holder 15.

The rear casing 19 has a corresponding function, although it can be a smaller casing, especially concerning its dimensions in the axial direction. The rear casing 19 envelops the backwards directed guiding shaft 30 of the pin 14 in a portion which protrudes through a suitably cylindrical opening 40 in the rear end 41 of the front casing. The outwards facing cylindrical casing surface 42 of the guiding shaft and the opening 40 with its inwardly facing cylindrical casing surface are of such dimensions that the guiding shaft guides the rear end 41 of the casing in the opening 40. The centering of the pin in its inner end 43 relative to the holder 15 is assured by the inner casing 19, by interaction with a conical guiding surface 44 in a portion 45 of the cavity 20 of the holder 15. This rear conical guiding surface 44 in the cavity 20 is, in similarity to the forward conical guiding surface 39, tapered in the backwards direction inwards relative to the front end of the pin 14, and interacts with a corresponding rear conical guiding surface 46 on the rear casing 19 for centering of the shaft 30, i.e. its rear end 43. In more detail, the rear casing 19 is exposed to a spring force in an opposing direction relative to the spring bias of the pin, i.e. axially backwards, which is assured by means of a pressure coil which is designed such as a spring coil 47. This is arranged between two seats, a first seat 48 formed by a recess which is arranged on the outside of the rear part 41 of the front casing 18, while the other seat 49 is formed by a recess on the rear casing 19 which faces away from the conical guiding surface 46 of the casing. This spring coil 47 has a short coil length relative to the pressure coil 31 of the pin 14, and is considerably much weaker than the larger spring 31, by means of which it is assured that all conical surfaces are in the intended contact position.

Figure 4:
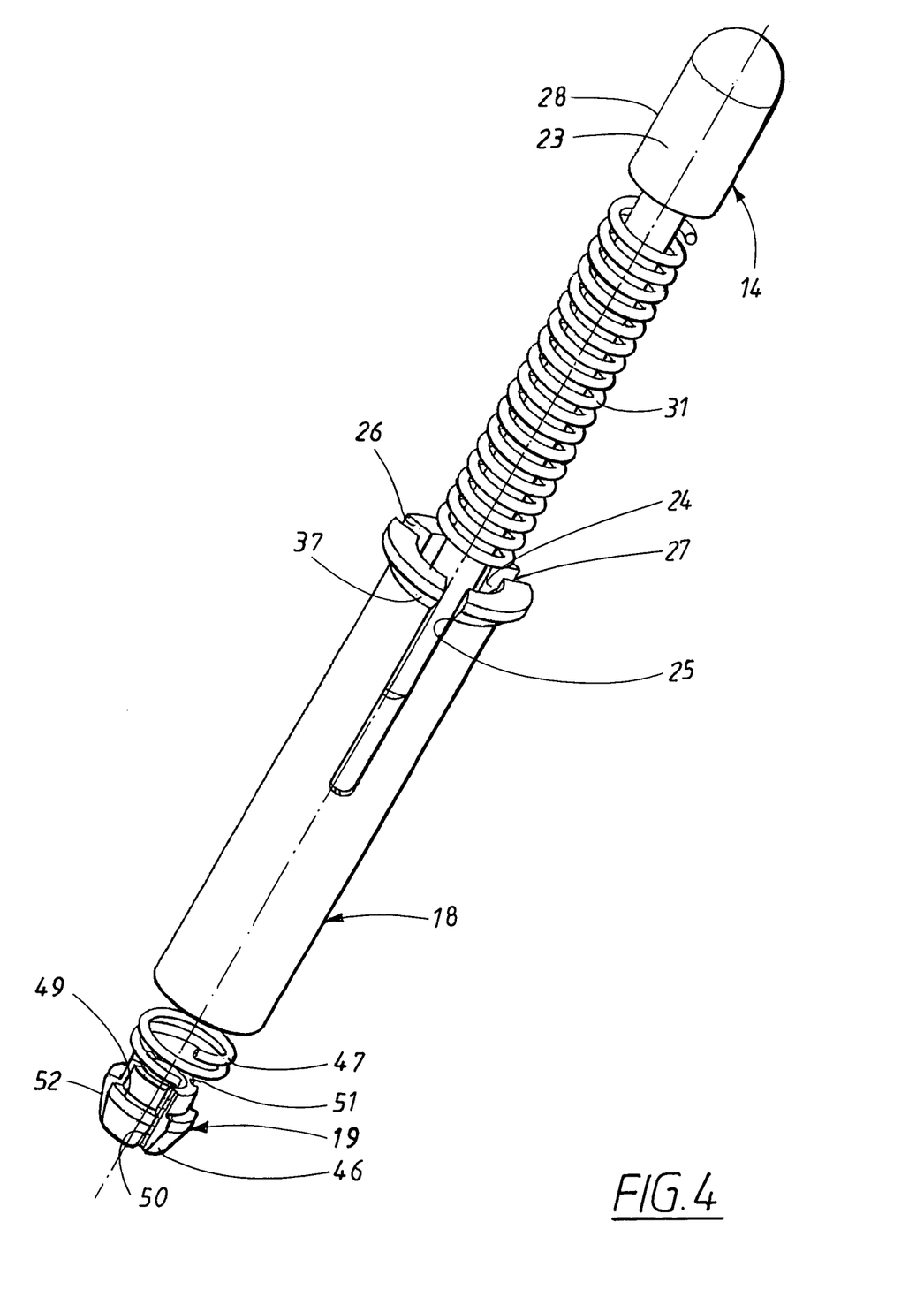
FIG. 4 is an exploded view of the position locking device without holder.
Figure 5:
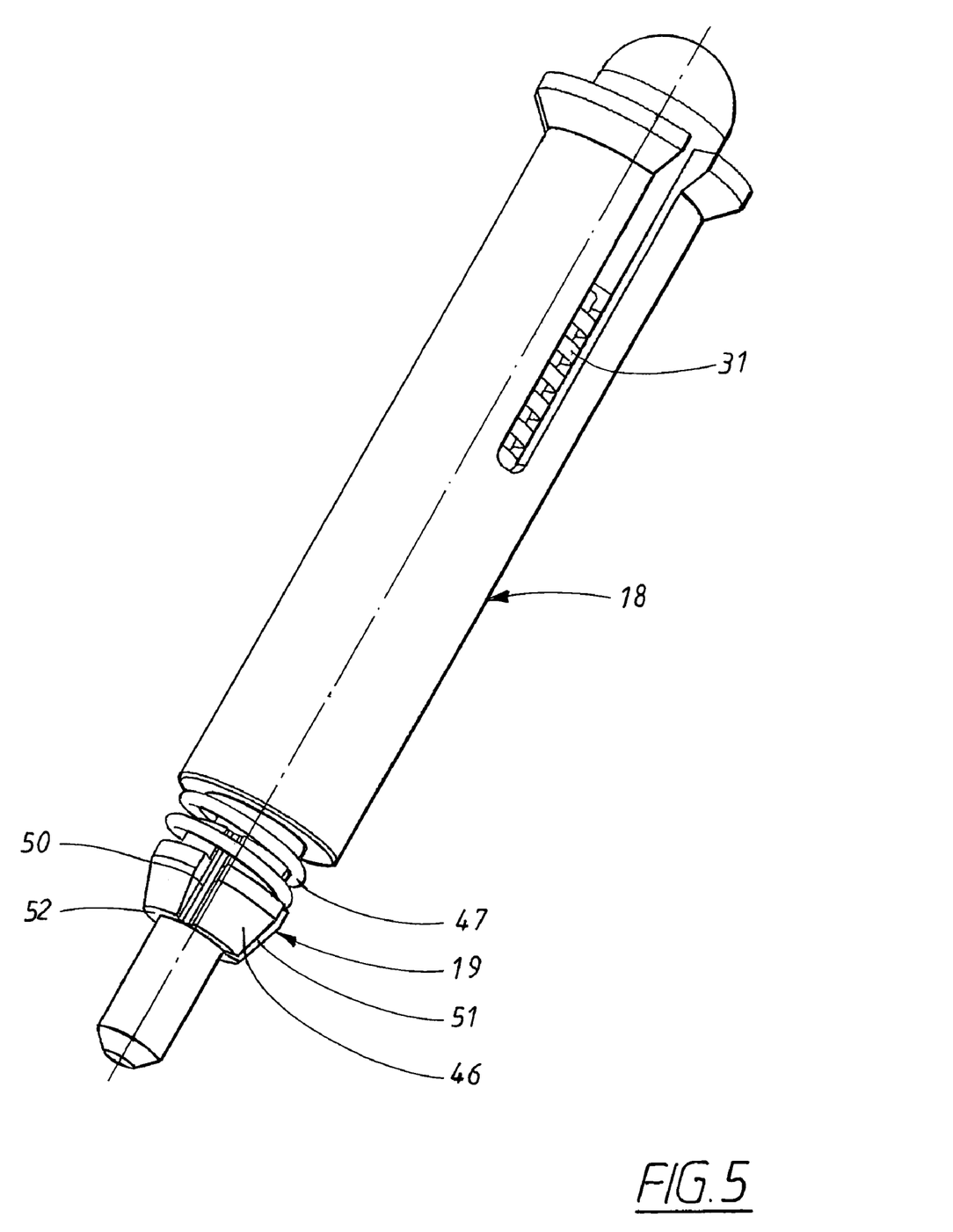
FIG. 5 is a perspective view of the device according to FIG. 4, FIGS. 6 and 7 are a side view and a schematic longitudinal cross-section respectively through an adjustment device according to a second embodiment.

In the exploded view in FIG. 4, all the comprised components can be seen apart from the holder 15, while FIG. 5 shows the corresponding parts in an operative use position with the two springs 31, 47 slightly pressed together. From these two figures, it will be seen that the rear, i.e. the smaller casing 19 is also provided with slits, and in the example shown exhibits three or more grooves 50, 51, 52 which extend along the entire axial length of the casing, and can suitably be radially not through going, in order to hold the casing in one piece. By means of the grooves, the inner gliding surface 53 is made slightly resilient radially towards the pin 14, in more detail the outwards facing cylinder casing shaped guiding surface 54 of the guiding shaft 30, see also FIG. 3.

In conclusion, the function of the position retaining device with the centering device is as follows. The pin 14, is with its end part 17, held with an end position limit against the fixed position retaining part 13, i.e. the guiding surface 16 by means of the altered position of the guiding surface. In case of a movement of the pin along the guiding surface, the pin 14 is allowed to assume different axial relative positions along the axis 21 relative to the holder 15. By means of the pressure coil 31 being biased between the pin 14 and the front casing 18, this is constantly spring biased by the spring 31 in a direction into the holder, i.e. in the axial direction to the right in FIG. 3. Due to interaction between the conical guiding surface 37 of the casing and the conical guiding surface of the holder, there is a centering of the longitudinal axis 21 of the pin relative to the longitudinal axis of the holder 15, which thus coincide. Not just the casing 18 is centred relative to the holder, but also the pin, due to the fact that the end part 36 of the casing and thereby also its guiding surface 37 is divided into sections, in the example shown three sections, which by means of the interaction of the conical surfaces and the axial force in the backwards direction presses the sections of the casing radially inwards with full force symmetries so that any play in the internal gliding surface between the inwards facing surface of the casing and the outwards facing gliding surface 28 of the pin is eliminated. In this way, both full centering and full freedom of play of the pin 14 relative to the holder 15 is obtained. In a corresponding manner, the rear smaller casing 19 is subjected to an axial spring force in the inwards direction, i.e. to the right in the direction of the longitudinal axis 21, see FIG. 3. This is due to the fact that the inner casing is spring biased by means of the smaller spring 47 in direction to the right, since the larger spring 31 overcomes the smaller spring, while the first seat 41 of the smaller spring is normally axially non-mobile. Since the rear casing 19 is also sectioned with grooves, and by means of coil effect from the smaller coil 47, the casing will be centred by means of interaction of the conical guiding surfaces 44, 46. Since the casing is pressed radially against the guiding shaft 30, there is play-free centering of the rear end of the pin 43 also, and thus the pin in spite of its axial mobility will always be coaxial with the holder 15.

Since the fixed position-retaining part 13 offers distinct positions, and since the mobile position-retaining part 12 has well centered parts which interact without any play, the manoeuvring stick 3 will also be kept in distinct predetermined positions. In the first shown example this regards angular positions about a rotational axis, but can also consist of longitudinal displacement positions, for example along an axis 10. This can for example be the case in a gearshift-stick for motor vehicles, where both rotational positions and longitudinal displacement positions can be assumed. For engine vehicles, distinct play-free positions are particularly valuable, since play can cause vibrational sounds in an engine both since it moves and since it has a vibration causing driving source. Due to elimination of play, and due to the centering, the comprising parts can be manufactured with lower requirements for tolerances, which means lower costs of production.

Figure 6:
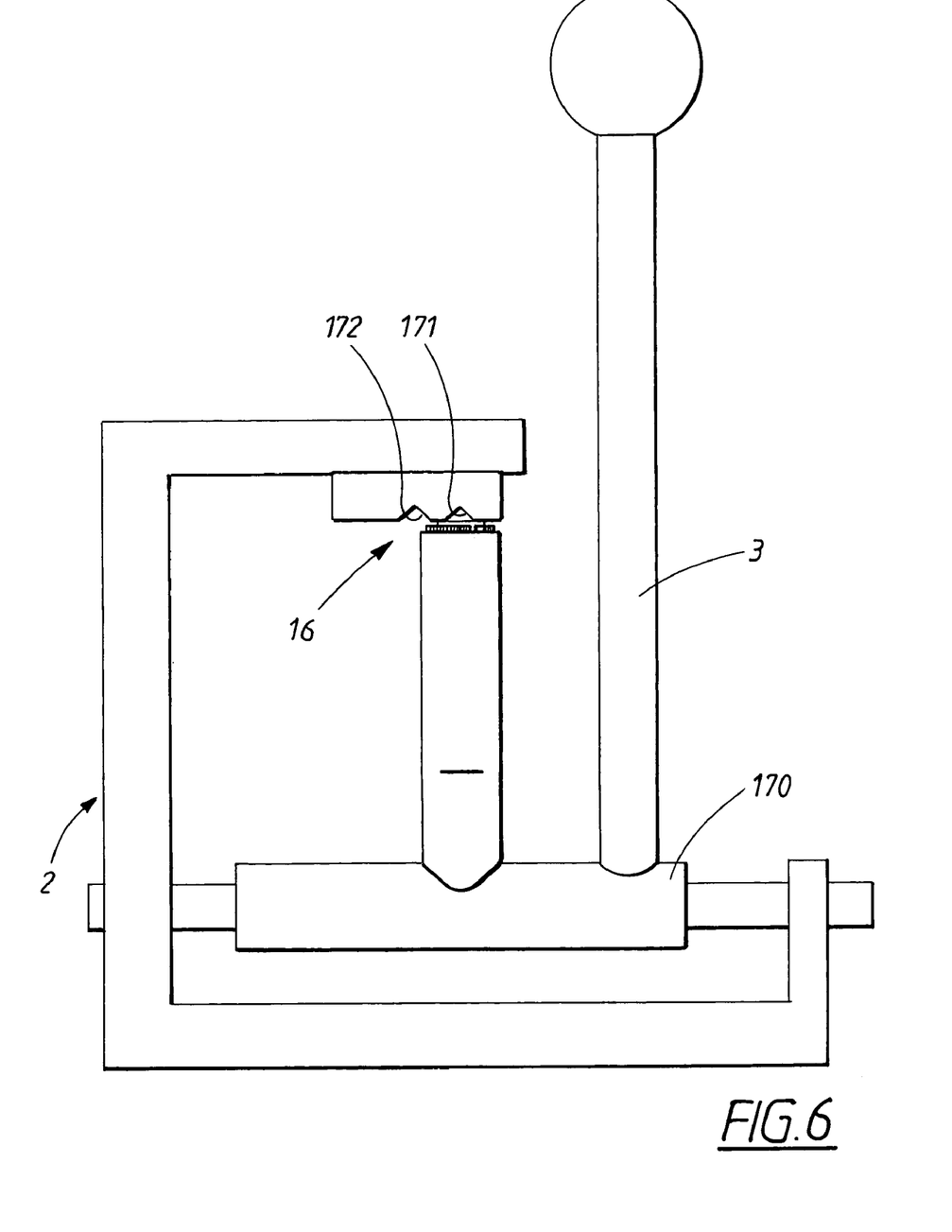
Figure 7:
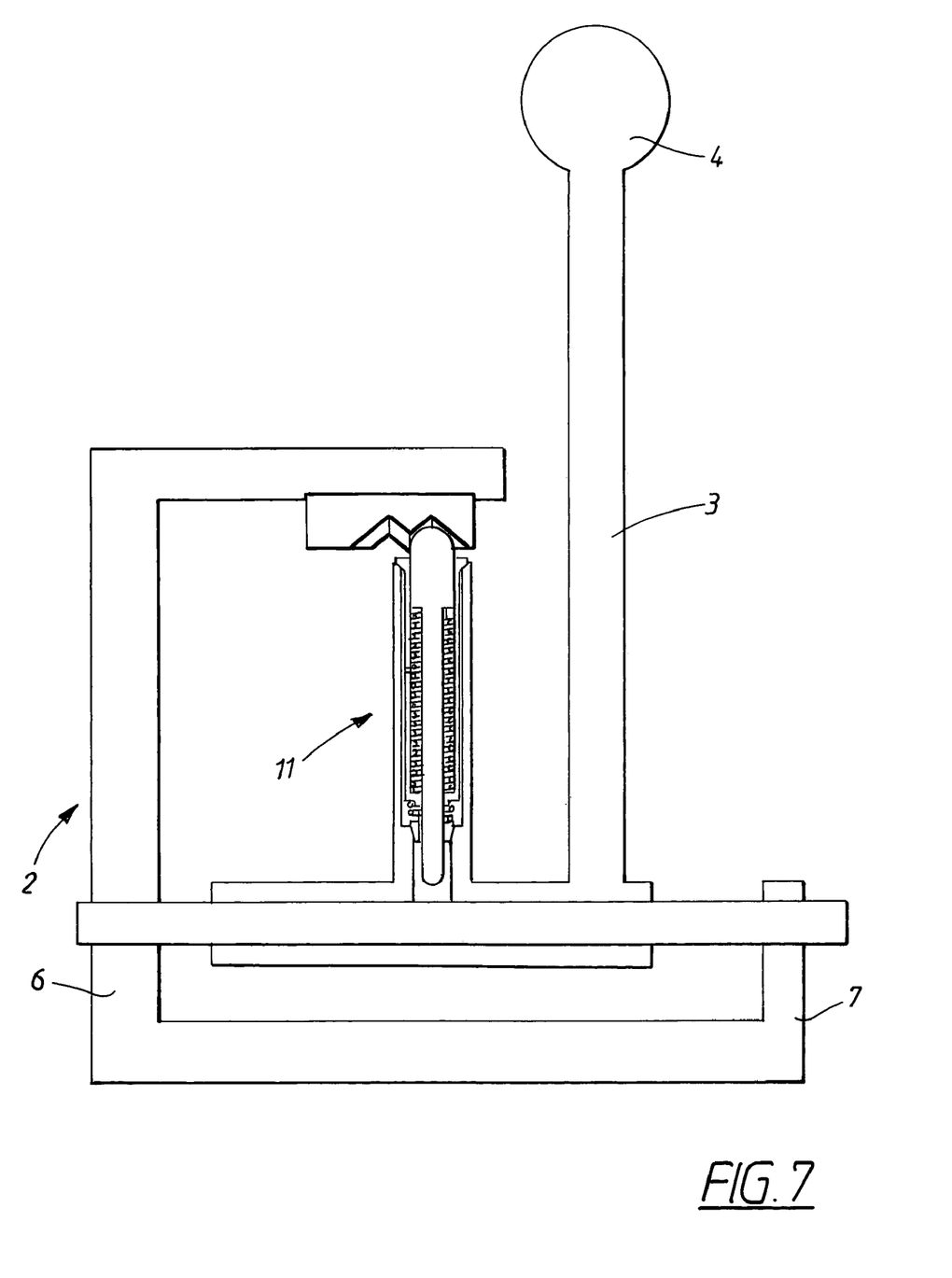

The example of an embodiment of FIGS. 6 and 7 shows the above-mentioned alternative, where the position adjustment takes place by means of longitudinal displacement along the longitudinal axis 10. The centering device and the position retaining device are designed and function in the same way as in the first example, so reference is made to the description of FIGS. 1-5 for the description of these parts. The position adjustment in the example shown can most simply be carried out by means of the adjustable part 3 exhibiting an axis casing 170 which is longitudinally displaceable along the axis 5 which still can also serve as an axis of rotation, i.e. the examples of embodiments according to FIGS. 1-2 and 6-7 can be combined in one and the same adjustment device, for example a gearshift-stick, where a shift-stick is both rotateable and sideways movable between various gear positions. The axis 5 can alternatively be movably arranged, i.e. both rotational and displaceable in the longitudinal direction in the two suspension holes of the console 2. The positions of the sideways movement, in the example shown two positions, is assured by means of the fixed position retaining organ 16 having at least two concave portions 171, 172 arranged in the direction of the longitudinal axis.

In the examples of embodiments described above, the centering of the position retaining device indirectly causes the play to be absorbed at the shaft 5 as well, i.e. if the adjustment part 3 with its casing is arranged on the axis 5, there will be a radial force on the axis casing 170 which eliminates the feeling of play.

Figure 8:
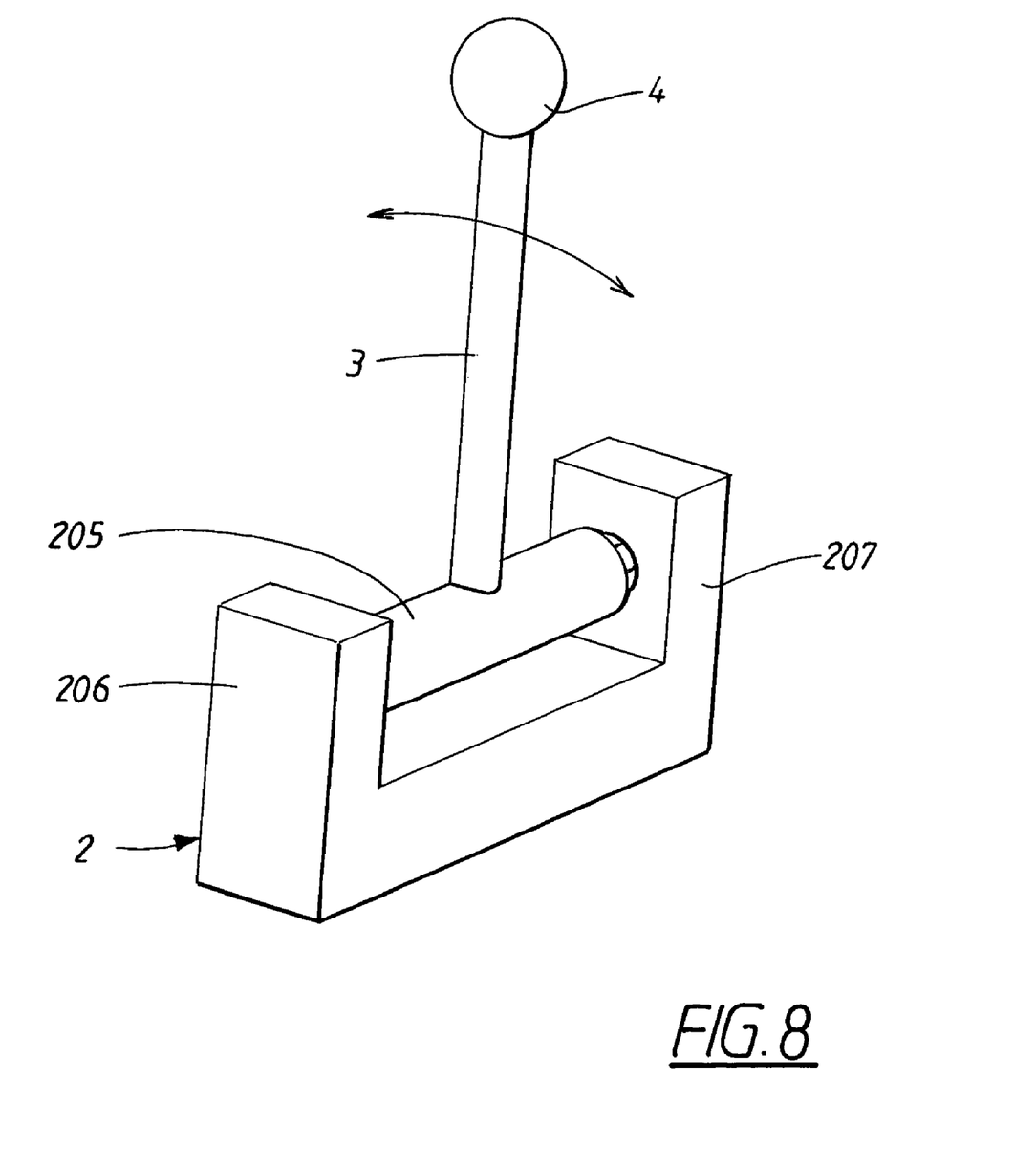
FIGS. 8 and 9 are a perspective view and a schematic cross-section view respectively of an adjustment device according to a third embodiment.
Figure 9:
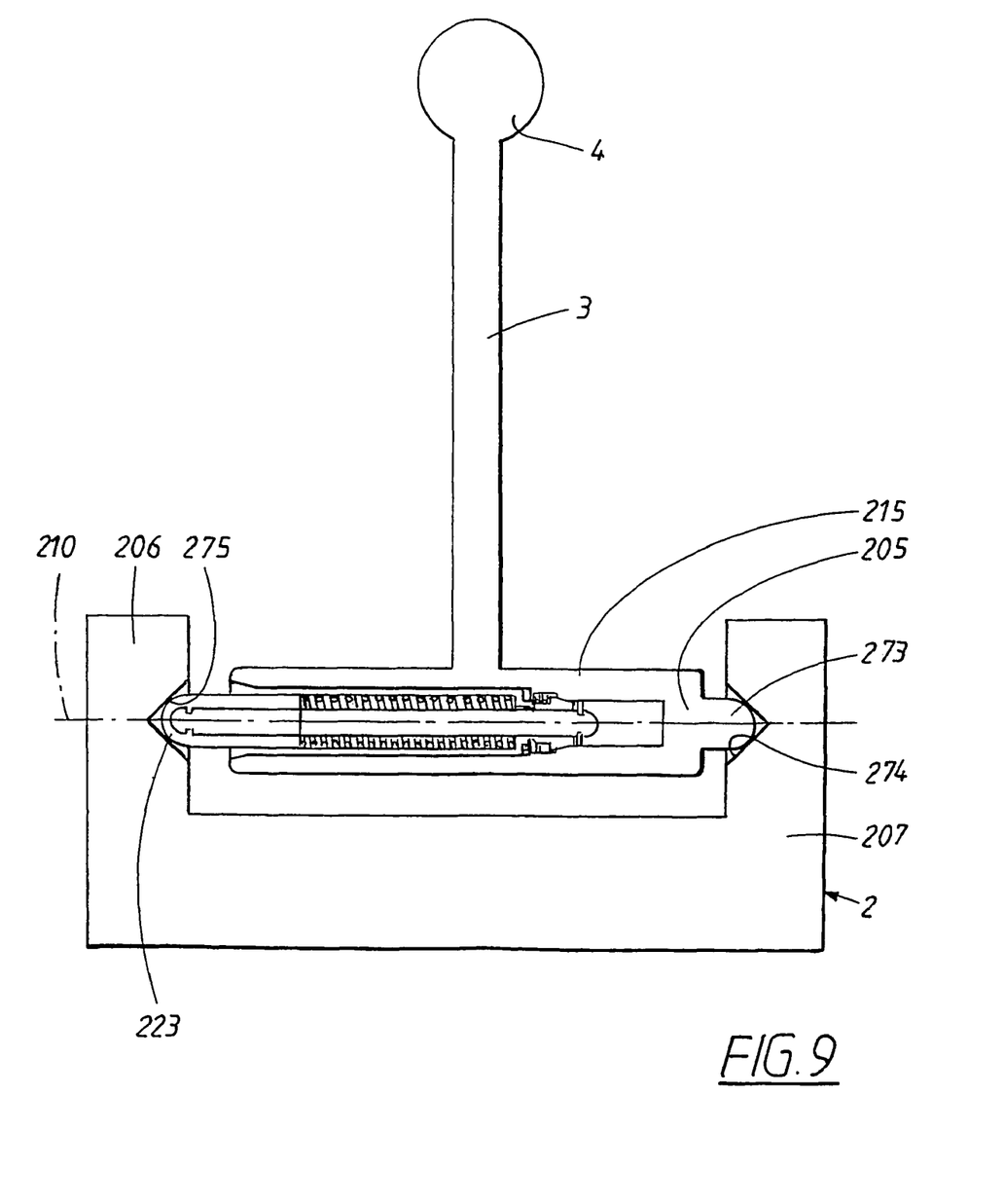

The third example of an embodiment according to FIGS. 8 and 9 shows how the centering device according to the invention is arranged in the adjustment axis 205, and has the same design as in the first example, with the difference that the holder 215 is also shaped with a pin 273 which is not axially movable in the holder, and is guided in a concave guiding section 274 in the one end piece 207 of the console 2. In the opposite end piece 206, there is arranged a concave control section 275 against which the pin head 223 is spring biased similarly to FIGS. 1 and 2. The two pins 223, 273 and the control sections 274, 275 form a play-free suspension for the rotation of the shift stick 3 about the axis 210.

The invention is not limited to the above described and in the drawings shown example of embodiments, but can be varied within the frame of the appended claims. For example, the position-retaining device can also be used in an adjustment device with a part which can be adjustable between various positions, and which part is arranged to perform a purely translational movement, i.e. longitudinal displacement movement along a linear or arc shaped path between predetermined positions. Additionally, it is possible to let the fixed and the moving position retaining part shift places, so that the groove is arranged in the adjustable part, while the holder and the pin are arranged in the console.

For reasons of clarity a very simple manoeuvring device has been chosen, while in reality a manoeuvring device of, for example, the gear-shifting device kind can be given a considerably much more complicated pattern of movement, which is possible utilizing the play-eliminating principle according to the invention. Additionally, it has not been described how the movements and positions of the manoeuvring device are transferred to the mechanism to be manoeuvred. This can, in the simplest form, take place by means of a wire or an arm being connected to the manoeuvring part at a distance from the geometrical axis of the manoeuvring axis, so that the rotational movement can be transferred into a linear movement back and forth, which is transferred to, for example, a gearbox. Alternatively, the movements and positions of the manoeuvring part can be detected electrically or optically, and transferred via signals to the gearbox. It is also possible to let the movements and positions of the manoeuvring device be transferred hydraulically to the gearbox. The adjustment device can in principle be used for completely different purposes than the manoeuvring of a gearbox in a motor vehicle.

The invention claimed is:

1. A centering device adapted for aligning an elongate element comprising:
   a retaining organ part having a guiding surface;
   a holder associated with the elongate element and having a first end, a second end, a cavity extending therebetween, and a longitudinal axis extending from said first end to said second end, said holder further including a seat positioned proximate said first end;
   a casing having a first end, a second end, and an abutment disposed proximate said first end of said casing, said casing being positioned with said abutment of said casing adjacent said set of said holder, said casing being biased toward said second end of said holder such that said abutment tends to apply pressure against said set of said holder, and
   a pin having a shaft and a head, said shaft being positioned within said casing and said head being positioned proximate said guiding surface of said retaining part, said pin being biased toward said retaining part such that said head of said pin tends to urge a force against said guiding surface;

wherein the abutment of the casing strives to be in contact with said seat of said holder for centering said casing and said pin relative to said longitudinal axis of said holder.

2. The centering device of claim 1, wherein the retaining part constitutes a bearing suspension for a rotational axis, which forms the elongate element.

3. An adjustment device comprising:
a console having a maneuvering device disposed therein, said maneuvering device adjustable between different positions;
a positioning-retaining device for moving and securing said maneuvering device in and between a plurality of predetermined positions, said positioning-retaining device comprising:
a holder associated with the elongate element and having a first end, a second end, a cavity extending therebetween, and a longitudinal axis extending from said first end to said second end, said holder further including a seat positioned proximate said first end;
a casing having a first end, a second end, and a abutment disposed proximate said first end of said casing, said casing being positioned with said abutment of said casing adjacent said seat of said holder, said casing being biased toward said second end of said holder such that said abutment tends to apply pressure said seat of said holder, and
a pin having a shaft and a head, said shaft being positioned within said casing and said head being positioned proximate said guiding surface of said retaining part, said pin being biased toward said retaining part such that said head of said pin tends to urge a force against said guiding surface;
wherein the abutment of the casing strives to be in contact with said seat of said holder for centering said casing and said pin relative to said longitudinal axis of said holder.

4. The adjustment device of claim 3, wherein said casing includes partitions extending along said shaft and said abutment, said partitions extending in a direction of said longitudinal axis of said holder thereby providing said casing with an elastic front end, wherein said pin is captured within said elastic front end.

5. The adjustment device of claim 3, wherein said casing includes a front casing and a rear casing in communication with each other, said rear casing having a second abutment adjacent said second end of said casing, wherein said holder includes a rear seat with a guiding surface and the second abutment is positioned adjacent thereto, wherein said adjustment device further includes a coil positioned between said front casing and said rear casing that exhibits an axial spring force which is lower than the force tending to urge said abutment against said guiding surface of said retaining part, thereby causing said abutment and second abutment to strive to be in contact with said seat and rear seat respectively, centering said pin both at a forward end and a rear end.

6. The adjustment device of claim 5, wherein said rear casing is provided with slits dividing said rear casing into partial sections, and cause said axial spring force to press said sections radially inwards against said pin.

* * * * *

UNITED STATES PATENT AND TRADEMARK OFFICE
CERTIFICATE OF CORRECTION

PATENT NO. : 7,246,538 B2 Page 1 of 1
APPLICATION NO. : 10/470668
DATED : July 24, 2007
INVENTOR(S) : Bengt Hermansson It is certified that error appears in the above-identified patent and that said Letters Patent is hereby corrected as shown below:

Column 5, line 5, delete the word "is" and insert the word --are--.
Column 5, line 27, insert comma --,-- after the word "can".
Column 5, line 27, insert comma --,-- after the word "example".
Column 5, line 56, delete the word "is" and insert the word --are--.
Column 7, line 10, insert the word --being-- after the word "device".
Column 7, line 21, delete the word "a" and insert the word --an--.
Column 7, line 26, please insert the word --on-- after the word "pressure".
Column 6, line 28, the word "change" should read --changes--.

Signed and Sealed this

Thirteenth Day of November, 2007

JON W. DUDAS
*Director of the United States Patent and Trademark Office*